United States Patent
Sato et al.

(10) Patent No.: US 8,190,339 B2
(45) Date of Patent: May 29, 2012

(54) SHIFT CONTROL APPARATUS FOR AUTOMATIC TRANSMISSION

(75) Inventors: Haruki Sato, Anjo (JP); Nobuhiro Iwai, Okazaki (JP); Shoichiro Araki, Anjo (JP); Hiroshi Tsutsui, Nishio (JP)

(73) Assignee: Aisin AW Co., Ltd., Aichi-ken (JP)

( * ) Notice: Subject to any disclaimer, the term of this patent is extended or adjusted under 35 U.S.C. 154(b) by 843 days.

(21) Appl. No.: 12/251,817

(22) Filed: Oct. 15, 2008

(65) Prior Publication Data
US 2009/0171543 A1   Jul. 2, 2009

(30) Foreign Application Priority Data
Dec. 28, 2007   (JP) .................................. 2007-339367

(51) Int. Cl.
*G06F 19/00*   (2011.01)
(52) U.S. Cl. .......................................................... 701/55
(58) Field of Classification Search .................. None
See application file for complete search history.

(56) References Cited

U.S. PATENT DOCUMENTS 6,997,843 B2 *   2/2006   Saitou ........................... 475/269
2002/0086761 A1   7/2002   Hayabuchi et al.

FOREIGN PATENT DOCUMENTS

| JP | 2002-195401 A | 7/2002 |
|----|---------------|--------|
| JP | 2003-106440 A | 4/2003 |
| JP | 2006-275075 A | 10/2006 |

* cited by examiner

*Primary Examiner* — Jack W Keith
*Assistant Examiner* — Nagi Murshed
(74) *Attorney, Agent, or Firm* — Sughrue Mion, PLLC

(57) ABSTRACT

A shift controller controls a downshift to a low shift speed, spaced apart from a high shift speed by two or more steps, through an intermediate shift speed, by first releasing first and second shift release elements, then engaging a first shift engagement element, and finally engaging a second shift engagement element, while controlling the torque capacity of the second shift release element by feedback control. As a result of releasing the first and second shift release elements before engaging the first shift engagement element, it is possible to rev up an input rotation at maximum performance of an engine to reduce the time for shifting. As a result of the feedback control of the torque capacity of the second shift release element after engaging the first shift engagement element, a torque fluctuation at the intermediate shift speed can be reduced to avoid occurrence of an uncomfortable shift shock.

1 Claim, 13 Drawing Sheets

FIG.3

|   | C-1 | C-2 | C-3 | B-1 | B-2 | F-1 |
|---|---|---|---|---|---|---|
| P |   |   |   |   |   |   |
| REV |   |   | O |   | O |   |
| N |   |   |   |   |   |   |
| 1ST | O |   |   |   | (O) | O |
| 2ND | O |   |   | O |   |   |
| 3RD | O |   | O |   |   |   |
| 4TH | O | O |   |   |   |   |
| 5TH |   | O | O |   |   |   |
| 6TH |   | O |   | O |   |   |

* THE MARK (O) INDICATES ENGAGEMENT DURING ENGINE BRAKE

SHIFT CONTROL APPARATUS FOR AUTOMATIC TRANSMISSION

CROSS-REFERENCE TO RELATED APPLICATIONS

This application claims priority from Japanese Patent Application No. 2007-339367 filed on Dec. 28, 2007, the disclosure of which, including the specification, drawings and abstract, is incorporated herein by reference in its entirety.

BACKGROUND

1. Technical Field

Aspects of the present invention relate to a shift control apparatus for an automatic transmission mounted on a vehicle such as an automobile, and more in detail, to a shift control apparatus for an automatic transmission that is capable of providing improvement in a shift shock during a jumping shift by so-called clutch-to-clutch operation (engagement switching).

2. Description of the Related Art

Conventionally, for example, a stepped automatic transmission mounted on a vehicle is capable of shifting speeds by controlling the engagement state of a plurality of friction engagement elements (clutches and brakes) using a hydraulic control device, and thus forming a power transmission path in a speed change gear mechanism at each shift speed. Furthermore, in recent years, multi-speed automatic transmissions have been required to attempt an improvement in vehicle fuel consumption, and in order to select optimal shift speeds corresponding to the driver's requirement (that is, accelerator pedal stroke, and so on) in such automatic transmissions, it has become common to use jumping shifts, that is, speed shifting to a speed spaced apart by two or more steps (for example, 4th-to-2nd, 5th-to-2nd, 2nd-to-4th, and 2nd-to-5th shifts) at a single shifting operation.

Because the range of selection of a shift speed suitable for the driving condition of a vehicle becomes larger in the multiple speed gear train described above, the switching operation between friction engagement elements is not limited to a simple engagement switching using two elements but may even require a complex switching operation using, for example, four elements. For example, in an engagement switching operation of four elements (so-called dual changeover) in which two friction engagement elements are released and two friction engagement elements are engaged, if, for example, a 6th-to-3rd shift employs a 6th-4th-3rd shift operation using the fourth forward speed as an intermediate shift speed, the torque distribution ratio to a high clutch (C-2) at the intermediate shift speed is smaller than the torque distribution ratio to the high clutch at the sixth forward speed. As a result, the high clutch does not automatically slip during the 4th-to-3rd shift, resulting in a poor controllability of the high clutch. In addition, because the gear ratio changes quickly during the 6th-to-4th shift and the change in gear ratio is suppressed in the narrow range of the 4th-to-3rd shift, it is possible that the engine will race due to difficulty in control. Moreover, the clutch distribution ratios of the high clutch on the release side and a 3-5 reverse clutch (C-3) on the engagement side are small during the 6th-to-4th shift, which has a large effect on shock, and causes a susceptibility to variation of hydraulic pressure.

Therefore, in order to dissolve the problems as described above, shift control apparatuses for automatic transmissions have been developed such as those described below (refer, for example, to Japanese Patent Application Publication No. JP-A-2003-106440). When the shift control apparatus described in JP-A-2003-106440 performs a dual changeover shift in which two friction engagement elements to be engaged and two friction engagement elements to be released are changed over at the same time, shift control is made easy by reducing the time for shifting, and also hydraulic control during a second changeover shift, which has a large effect on shock, is made easy, thus enabling suppression of shift shocks.

During shifting by the engagement switching of the pairs of friction engagement elements (engagement switching of four elements), because the shift control apparatus described in JP-A-2003-106440 performs control such as engaging a friction engagement element (clutch 3-5R/C) serving as a shift engagement element at the end of a first changeover (first shift) in which friction engagement elements (brake 2-6/B and clutch H/C) serving as shift release elements are released, there is a concern that an occurrence of torque fluctuation at the intermediate shift speed can generate an uncomfortable shift shock, and also a concern that a slowing of rev-up of a turbine rotation in that period can cause a longer time required until the end of a second changeover (second shift), resulting in a longer time for shifting.

SUMMARY

Aspects of the present invention provide a shift control apparatus for an automatic transmission that is structured so as to perform the shifting quickly and also to eliminate the torque fluctuation at the intermediate shift speed during downshift to a speed spaced apart by two or more steps through the intermediate shift speed by disconnecting and connecting the respective pairs of the friction engagement elements, through forming a low shift speed by engaging a first shift engagement element after releasing a first and second shift release elements and also by engaging a second shift engagement element while controlling the torque capacity of the second shift release element by feedback control.

A first aspect of the present invention is that a shift control apparatus for an automatic transmission is used in a stepped automatic transmission which has a plurality of friction engagement elements whose engagement states achieve a plurality of corresponding power transmission paths in a speed change gear mechanism and which shifts speeds by switching engagement among those friction engagement elements, and the shift control apparatus includes a controller capable of controlling a downshift to a speed spaced apart by two or more steps through an intermediate shift speed by disconnecting and connecting respective pairs of the plurality of friction engagement elements at a single switching of the engagement; wherein the pairs of the friction engagement elements are: a pair of a first shift release element that is in the engaged state at a high shift speed on the higher speed side of the intermediate shift speed and released during shifting from the high shift speed to the intermediate shift speed, and a second shift release element that is in the engaged state at both the high and intermediate shift speeds and released during shifting to a low shift speed on the lower speed side of the intermediate shift speed; and a pair of a first shift engagement element that is in the released state at the high shift speed and engaged at the intermediate shift speed, maintaining the engagement until reaching the low shift speed, and a second shift engagement element that is in the released state at both the high and intermediate shift speeds, and engaged at the low shift speed; and the controller is structured to form the low shift speed, during the downshift, by first releasing the first and second shift release elements, then engaging the first shift engagement element, and finally engaging the second shift engagement element while controlling the torque capacity of the second shift release element by feedback control.

In this case, during the downshift to the speed spaced apart by two or more steps through the intermediate shift speed by disconnecting and connecting the respective pairs of the friction engagement elements, the controller performs the control so as to form the low shift speed by first releasing the first and second shift release elements, then engaging the first shift engagement element, and finally engaging the second shift engagement element while controlling the torque capacity of the second shift release element by feedback control. Therefore, as a result of releasing the first and second shift release elements before engaging the first shift engagement element, it is possible to rev up an input rotation (turbine rotation) at maximum performance of an engine to which the automatic transmission is connected, to reduce the time for shifting, and also as a result of the feedback control of the torque capacity of the second shift release element after engaging the first shift engagement element, the torque fluctuation at the intermediate shift speed can be reduced to avoid occurrence of an uncomfortable shift shock.

A second aspect of the present invention is that the controller is structured to form the low shift speed by, at first during the releasing of the first and second shift release elements, virtually completely releasing the first shift release element and releasing the second shift release element to make its torque capacity stand by at a pressure near an engagement starting pressure, then engaging the first shift engagement element so as to acquire a predetermined torque capacity, and finally engaging the second shift engagement element at a predetermined rate without a halt, while controlling, by feedback control, the torque capacity of the second shift release element standing by at the pressure near the engagement starting pressure.

In this case, the controller performs the control so as to form the low shift speed by, at first during the releasing of the first and second shift release elements, virtually completely releasing the first shift release element and releasing the second shift release element to make its torque capacity stand by at a pressure near the engagement starting pressure, then engaging the first shift engagement element so as to acquire the predetermined torque capacity, and finally engaging the second shift engagement element at the predetermined rate without a halt, while controlling, by feedback control, the torque capacity of the second shift release element standing by at the pressure near the engagement starting pressure. Therefore, even while the first shift engagement element is engaging, it is possible to rev up the input rotation (turbine rotation) at maximum performance of the engine to which the automatic transmission is connected, by putting the second shift release element under the pressure near the engagement starting pressure; thus a disadvantage can be avoided such as an increase in the time for shifting due to the time required until the end of the second shift.

Note that the above reference numerals in parentheses are used for reference to the drawings, and are used for convenience of easy understanding of the present invention; therefore, they have no influence on the description of the claims.

BRIEF DESCRIPTION OF THE DRAWINGS

The aspects of the present invention will become more apparent by describing in detail exemplary embodiments thereof with reference to the accompanying drawings, in which:

FIG. 3 is an engagement table for the automatic speed change mechanism consistent with an exemplary embodiment of the present invention;

DETAILED DESCRIPTION OF EXEMPLARY EMBODIMENTS

Figure 1:
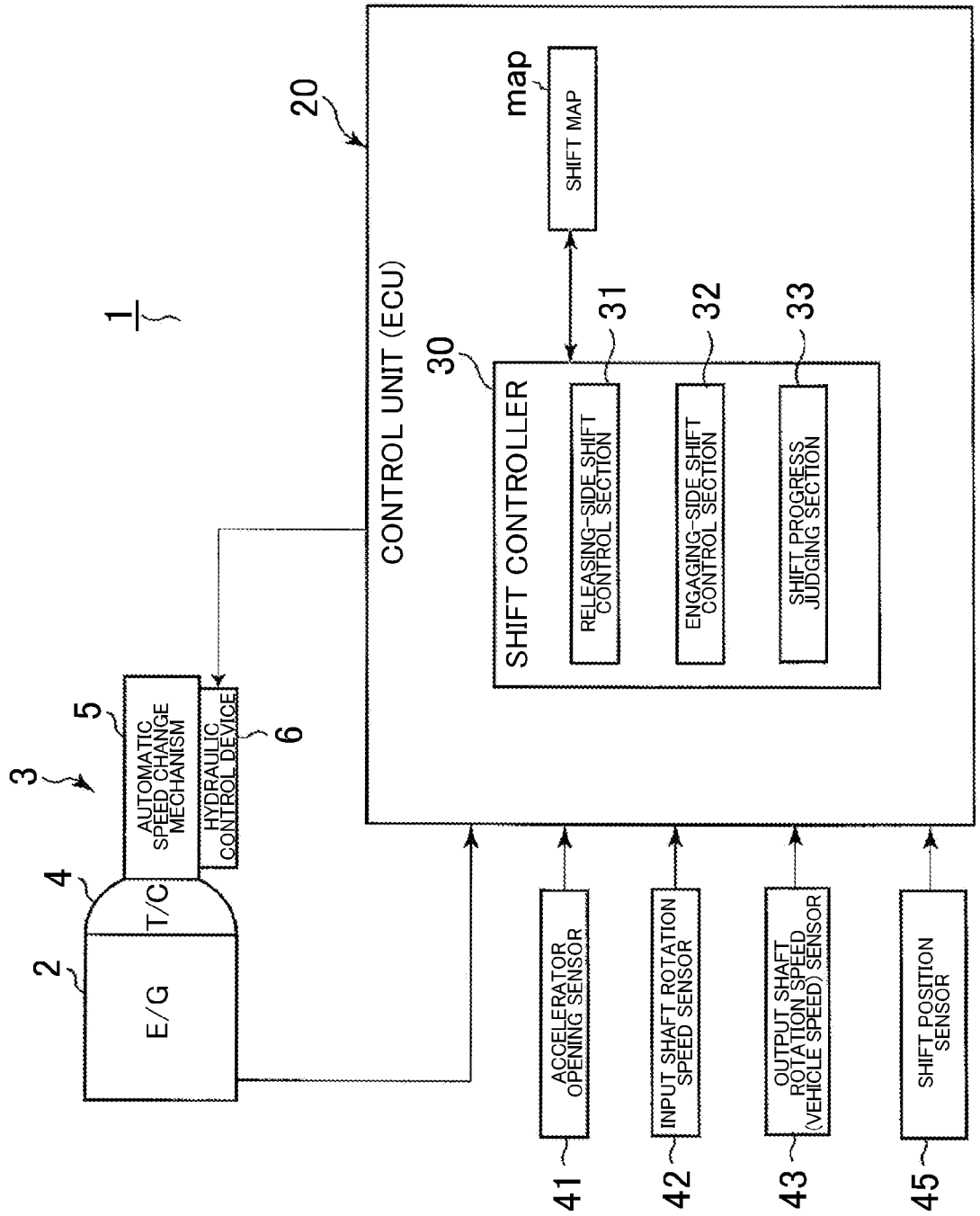
FIG. 1 is a block diagram showing an electrical control system, etc. for a shift control apparatus for an automatic transmission according to an exemplary embodiment of the present invention.

Exemplary embodiments of the present invention will be described below with reference to FIGS. 1 to 13.

First, the outline structure of an automatic transmission 3 to which the present invention can be applied will be described with reference to FIG. 2. As shown in FIG. 2, the automatic transmission 3, which is suitable for use in, for example, an FF (front engine, front drive) type vehicle, has an input shaft 8 of the automatic transmission 3 connectable to an engine 2 (refer to FIG. 1), and is provided with a torque converter 4 and an automatic speed change mechanism 5 with their centers on the axis of the input shaft 8. Note that a reference numeral 9 shows a transmission case for housing the automatic speed change mechanism 5.

The automatic transmission 3 is a stepped automatic transmission, which has clutches C-1, C-2, and C-3, and brakes B-1 and B-2 serving as friction engagement elements whose engagement states achieve a plurality of corresponding power transmission paths in the automatic speed change mechanism 5 (speed change gear mechanism), and which shifts speeds by switching engagement among those friction engagement elements. A shift controller 30, described later, controls a downshift to a speed spaced apart by two or more steps through an intermediate shift speed by disconnecting and connecting the respective pairs of the plurality of friction engagement elements at a single switching of the engagement.

The above-mentioned torque converter 4 has a pump impeller 4a connected to the input shaft 8 of the automatic transmission 3. The torque converter 4 comprises a turbine runner 4b to which the rotation of the pump impeller 4a is transmitted through hydraulic fluid. The turbine runner 4b is connected to an input shaft 10 of the above-mentioned automatic speed change mechanism 5 arranged coaxially with the input shaft 8. In addition, the torque converter 4 is provided with a lockup clutch 7, and when the lockup clutch 7 is engaged by hydraulic control of a hydraulic control device 6 (refer to FIG. 1), the rotation of the input shaft 8 of the automatic transmission 3 is directly transmitted to the input shaft 10 of the automatic speed change mechanism 5.

The automatic speed change mechanism 5 is provided with a planetary gear SP and a planetary gear unit PU on the input shaft 10. The planetary gear SP is a so-called single pinion planetary gear, which is provided with a sun gear S1, a carrier CR1, and a ring gear R1. The carrier CR1 has a pinion P1 that meshes with the sun gear S1 and the ring gear R1.

In addition, the planetary gear unit PU is a so-called Ravigneaux type planetary gear, which has a sun gear S2, a sun gear S3, a carrier CR2, and a ring gear R2 as four rotating elements. The carrier CR2 has a long pinion PL that meshes with the sun gear S2 and the ring gear R2, and a short pinion PS that meshes with the sun gear S3, in an intermeshing manner.

The sun gear S1 of the planetary gear SP is connected to an unshown boss that is fixed as a unit to the transmission case 9, so as to be rotationally fixed. In addition, the ring gear R1 makes the same rotation as the rotation of the input shaft 10 (hereinafter called "input rotation"). Moreover, the carrier CR1 makes a decelerated rotation, which is decelerated from the input rotation by the fixed sun gear S1 and the ring gear R1 making the input rotation, and is also connected to the clutch C-1 and the clutch C-3.

The sun gear S2 of the planetary gear unit PU can be fixed to the transmission case 9 by being connected to the brake B-1 composed of a band brake, and is also connected to the clutch C-3 to be able to receive the decelerated rotation input from the carrier CR1 through the clutch C-3. In addition, the sun gear S3 is connected to the clutch C-1 so as to be able to receive the decelerated rotation input from the carrier CR1.

Moreover, the carrier CR2 is connected to the clutch C-2 receiving the rotation input from the input shaft 10 to be able to receive the input rotation through the clutch C-2, and also connected to a one-way clutch F-1 and the brake B-2, to be restricted in rotation in one direction relative to the transmission case 9 through the one-way clutch F-1 and to be able to be fixed in rotation through the brake B-2. Furthermore, the ring gear R2 is connected to a counter gear 11, and the counter gear 11 is connected to driving wheels through an unshown counter shaft and an unshown differential device.

Figure 4:
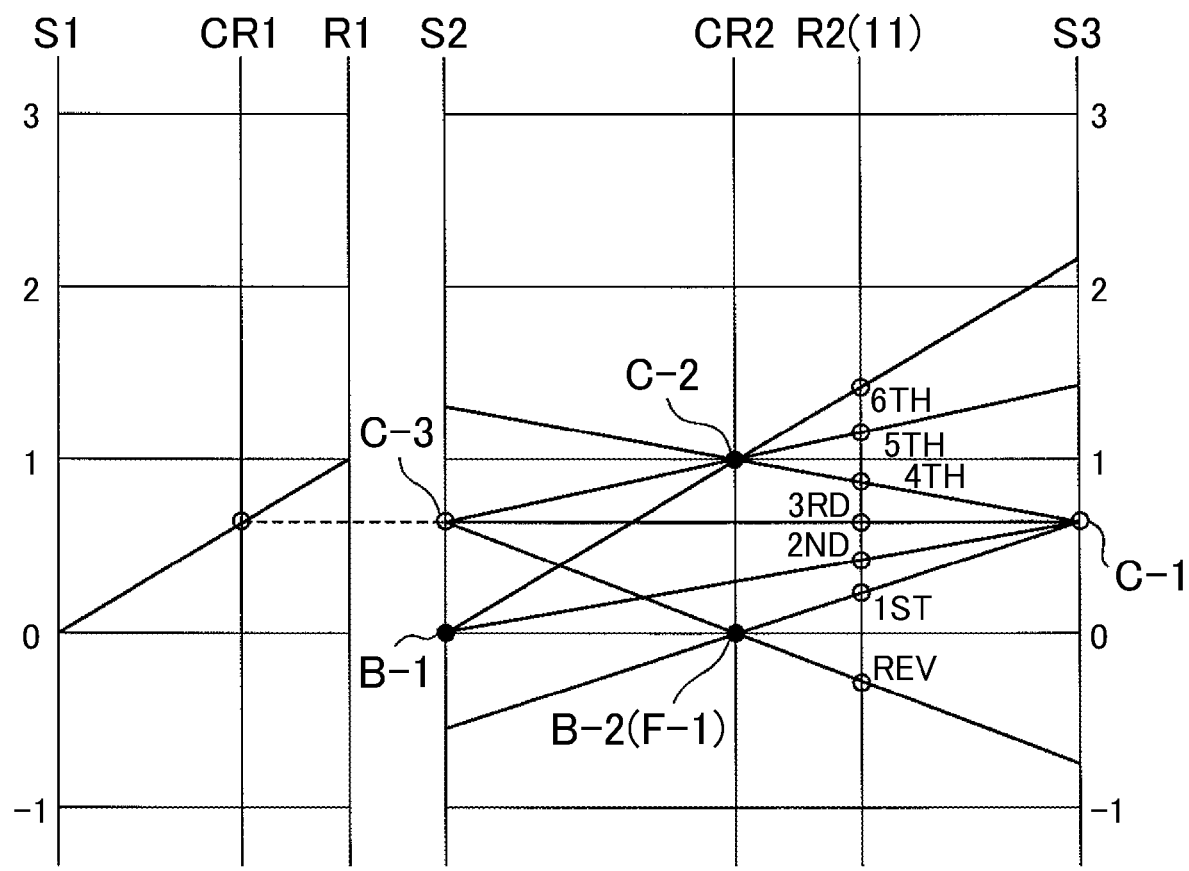
FIG. 4 is a velocity diagram for the automatic speed change mechanism consistent with an exemplary embodiment of the present invention.

Next, based on the above-described structure, the operation of the automatic speed change mechanism 5 will be described with reference to FIGS. 2, 3, and 4. Note that in the velocity diagram shown in FIG. 4, the direction of each vertical axis represents the rotation speed of a corresponding rotating element (gear), and the direction of the horizontal axis corresponds to the gear ratios of those rotating elements. In addition, in the area of the planetary gear SP of the velocity diagram, the vertical axes correspond to the sun gear S1, the carrier CR1, and the ring gear R1, in order from the left in FIG. 4. Moreover, in the area of the planetary gear unit PU of the velocity diagram, the vertical axes correspond to the sun gear S3, the ring gear R2, the carrier CR2, and the sun gear S2, in order from the right in FIG. 4.

For example, at the first forward speed (1ST) in the D (drive) range, the clutch C-1 and the one-way clutch F-1 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the rotation of the carrier CR2 is restricted to one direction (forward rotating direction); that is, the carrier CR2 is prevented from rotating in the reverse direction to be fixed. Then, the decelerated rotation input to the sun gear S3 is output to the ring gear R2 through the fixed carrier CR2, and thus the forward rotation as the first forward speed is output from the counter gear 11.

In addition, during engine braking (coasting), the above-described state of the first forward speed is maintained in the manner in which the brake B-2 is locked to fix the carrier CR2 so that the carrier CR2 is prevented from rotating forward. Moreover, because the carrier CR2 is prevented from rotating in the reverse direction and allowed to rotate forward by the one-way clutch F-1 at the first forward speed, the first forward speed can be achieved more smoothly by automatic engagement of the one-way clutch F-1, in the case, for example, of a shift from a non-drive range to a drive range.

At the second forward speed (2ND), the clutch C-1 is engaged and the brake B-1 is locked, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the rotation of the sun gear S2 is fixed by the locking of the brake B-1. Then, the carrier CR2 makes a decelerated rotation slower than that of the sun gear S3, and the decelerated rotation input to the sun gear S3 is output to the ring gear R2 through the carrier CR2; thus, the forward rotation as the second forward speed is output from the counter gear 11.

If the clutch C-1 is released from this state of the second forward speed (to a slipping state) by neutral control, as described later in detail, the ring gear R2 is allowed to rotate forward and prevented from rotating reversely by the one-way clutch F-1 for preventing the reverse rotation of the carrier CR2, and thus a state of so-called hill hold is achieved, in which the reverse motion of a vehicle (reverse rotation of driving wheels) is prevented.

At the third forward speed (3RD), the clutch C-1 and the clutch C-3 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the decelerated rotation of the carrier CR1 is input to the sun gear S2 by the engagement of the clutch C-3. Because, in other words, the decelerated rotation of the carrier CR1 is input to the sun gear S2 and the sun gear S3, the planetary gear unit PU makes the decelerated rotation in a directly connected state, and the decelerated rotation is directly output to the ring gear R2; thus, the forward rotation as the third forward speed is output from the counter gear 11.

At the fourth forward speed (4TH), the clutch C-1 and the clutch C-2 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the input rotation is input to the carrier CR2 by the engagement of the clutch C-2. Then, a decelerated rotation faster than that of the above-described third forward speed is produced by the decelerated rotation input to the sun gear S3 and the input rotation input to the carrier CR2, and is output to the ring gear R2; thus, the forward rotation as the fourth forward speed is output from the counter gear 11.

At the fifth forward speed (5TH), the clutch C-2 and the clutch C-3 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S2 through the clutch C-3. In addition, the input rotation is input to the carrier CR2 by the engagement of the clutch C-2. Then, an accelerated rotation slightly faster than that of the input rotation is produced by the decelerated rotation input to the sun gear S2 and the input rotation input to the carrier CR2, and is output to the ring gear R2; thus, the forward rotation as the fifth forward speed is output from the counter gear 11.

At the sixth forward speed (6TH), the clutch C-2 is engaged and the brake B-1 is locked, as shown in FIG. 3. Then, as shown in FIGS. 2 and 4, the input rotation is input to the carrier CR2 by the engagement of the clutch C-2. In addition, the rotation of the sun gear S2 is fixed by the locking of the brake B-1. Then, the input rotation of the carrier CR2 is made to be an accelerated rotation faster than that of the above-described fifth forward speed by the fixed sun gear S2, and is output to the ring gear R2; thus, the forward rotation as the sixth forward speed is output from the counter gear 11.

At the first reverse speed (REV), the clutch C-3 is engaged and the brake B-2 is locked, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S2 through the clutch C-3. In addition, the rotation of the carrier CR2 is fixed by the locking of the brake B-2. Then, the decelerated rotation input to the sun gear S2 is output to the ring gear R2 through the fixed carrier CR2, and thus the reverse rotation as the first reverse speed is output from the counter gear 11.

In addition, in the P (parking) range and in the N (neutral) range, the clutches C-1, C-2, and C-3 are released. Then, disconnection occurs between the carrier CR1 and the sun gears S2 and S3, that is, between the planetary gear SP and the planetary gear unit PU, and also the input shaft 10 and the carrier CR2 are disconnected. By this means, power transmission is disconnected between the input shaft 10 and the planetary gear unit PU, that is, between the input shaft 10 and the counter gear 11.

Next, a shift control apparatus 1 for the automatic transmission 3 according to the present exemplary embodiment of the present invention will be described with reference to FIGS. 1 and 5 to 14. Note that FIG. 1 is a block diagram showing an electrical control system, etc. for the shift control apparatus 1 for the automatic transmission 3 of the present exemplary embodiment.

Figure 2:
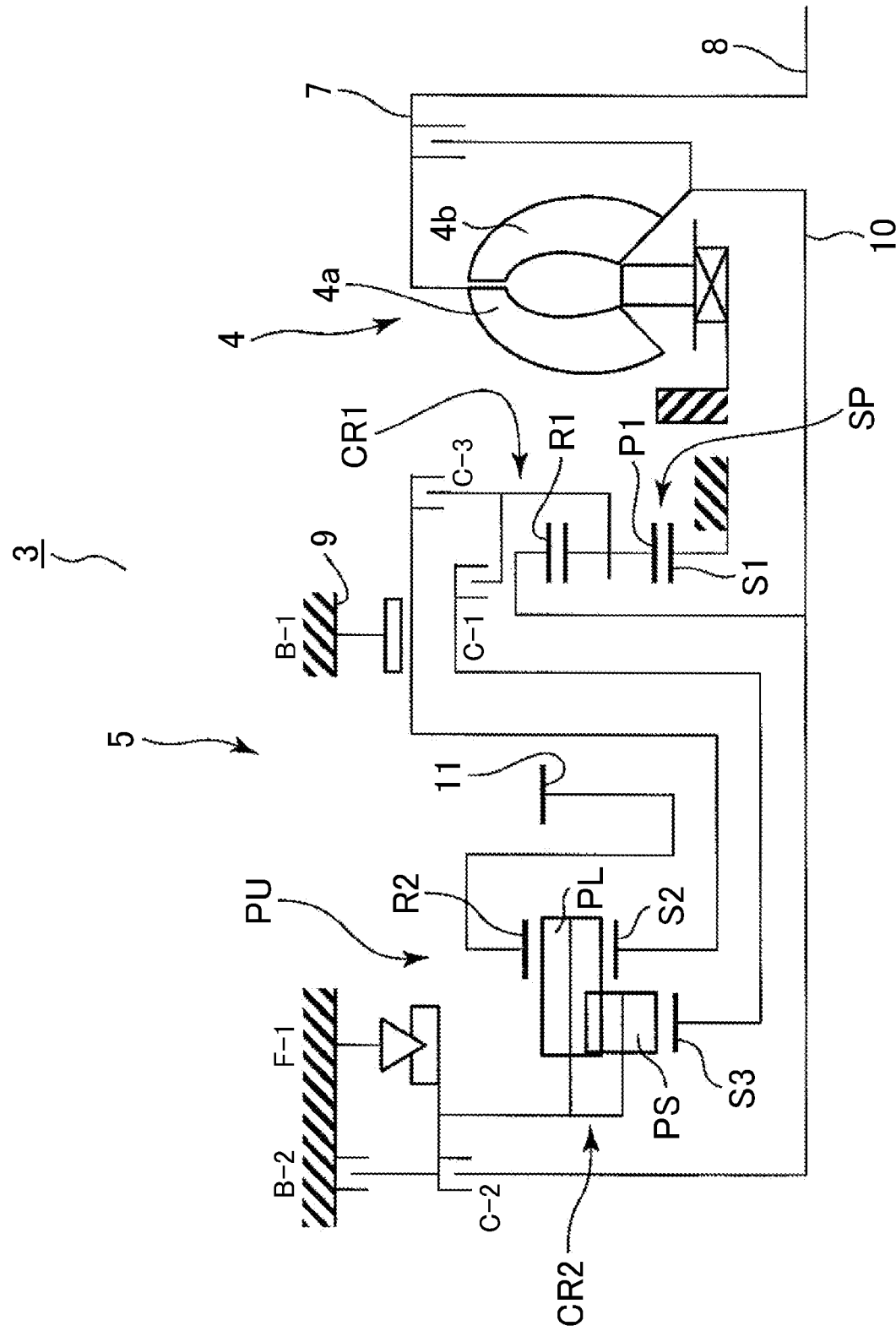
FIG. 2 is a schematic diagram showing an automatic speed change mechanism to which exemplary embodiments of the present invention can be applied.
Figure 9:
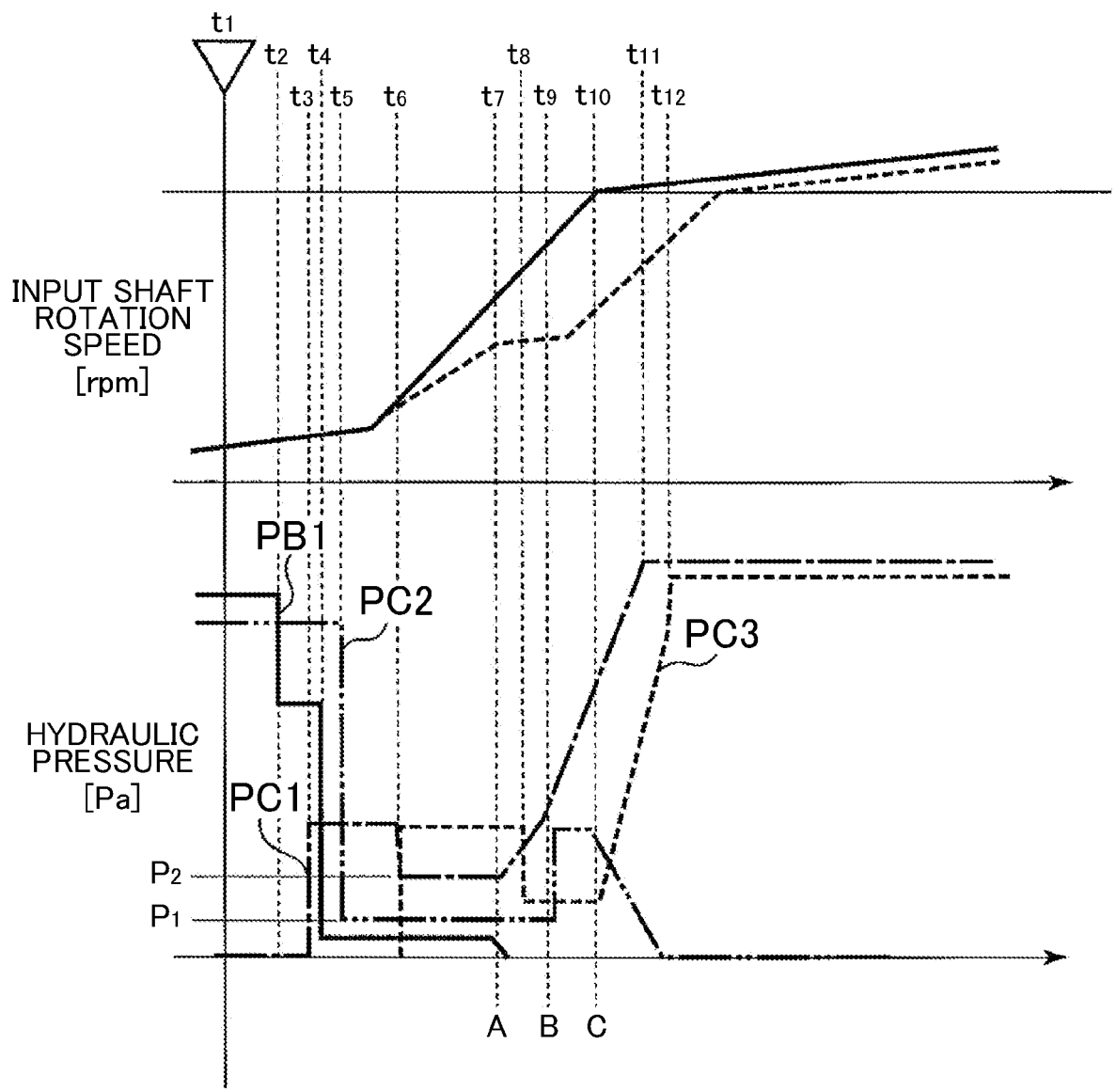
FIG. 9 is a time chart showing shift control according to an exemplary embodiment of the present invention.

Specifically, as shown in FIG. 1, the shift control apparatus 1 has a control unit (ECU) 20 comprising a microcomputer (MC) (not shown), and the control unit 20 is provided with a shift controller 30 and a shift map 50 (map). The graph shown in FIG. 9 is determined from the shift map 50 (map), corresponding to the accelerator pedal stroke by a driver. Note that although the hydraulic pressure [Pa] shown in FIG. 9 actually indicates a hydraulic pressure command value, it will be used as a hydraulic pressure in the description below.

To the above-mentioned control unit 20, there are connected an accelerator opening sensor 41 for detecting the angle of an accelerator pedal (not shown) (that is, the driver's accelerator pedal stroke) of a vehicle on which the automatic transmission 3 and the shift control apparatus 1 are mounted, an input shaft rotation speed sensor 42 for detecting the rotation speed of the input shaft 10 of the automatic speed change mechanism 5 (=turbine speed), an output shaft rotation speed (vehicle speed) sensor 43 for detecting the speed of the vehicle by detecting the rotation speed of the counter gear 11 that is coupled with the unshown driving wheels, and a shift position sensor 45 for detecting the selected position of a shift lever (not shown); from these sensors, a variety of signals are sent to the control unit 20.

The above-mentioned shift controller 30 refers to the shift map 50 (map) based on the accelerator opening detected by the accelerator opening sensor 41 and the output shaft rotation speed (vehicle speed) detected by the output shaft rotation speed sensor 43, and then, making a judgment on the selection among the above-described first to sixth forward speeds, and electronically controlling shift valves (not shown), etc. in the hydraulic control device 6, controls the engagement and release states of the above-mentioned clutches and brakes C-1, C-2, C-3, B-1 and B2 so that the selected shift speed is obtained. The hydraulic control device 6 is provided with many hydraulic servos (not shown) corresponding to the automatic speed change mechanism 5, as well as many shift valves for switching the hydraulic pressure to these hydraulic servos.

In addition, the shift controller 30 has releasing-side shift control section 31, engaging-side shift control section 32, and shift progress judging section 33.

The releasing-side shift control section 31 controls the releasing-side hydraulic pressure of the brake B-1 serving as a first shift release element and of the clutch C-2 serving as a second shift release element. The engaging-side shift control section 32 controls the engaging-side hydraulic pressure of the clutch C-1 serving as a first shift engagement element and of the clutch C-3 serving as a second shift engagement element. The shift progress judging section 33 detects the progress status of downshifting by detecting the rotation change based on the change in gear ratio during downshifting (power-on downshifting), and by comparing the detected value with a predetermined threshold value set in advance, judges the progress status of the shifting.

In other words, during downshifting, the shift controller (controller) 30 performs a control so as to form a low shift speed (third forward speed in the present exemplary embodiment) by first releasing the brake B-1 serving as a first shift release element and the clutch C-2 serving as a second shift release element, then engaging the clutch C-1 serving as a first shift engagement element, and finally engaging the clutch C-3 serving as a second shift engagement element while controlling the torque capacity of the clutch C-2 by feedback control (hereinafter also called FB control). More specifically, the shift controller 30 first virtually completely releases the brake B-1 and also releases the clutch C-2 to make its torque capacity stand by at a pressure near an engagement starting pressure ($P_1$ in FIG. 9) during the above-mentioned releasing of the brake B-1 and the clutch C-2, then engages the clutch C-1 so as to acquire a predetermined torque capacity (torque capacity set in advance [$P_2$ in FIG. 9]), and finally engages the clutch C-3 at a predetermined rate without a halt, while controlling, by feedback control, the torque capacity of the clutch C-2 standing by at the pressure near the engagement starting pressure, thus forming the third forward speed. The engagement starting pressure refers to a stroke-end pressure for bringing an unshown piston of the hydraulic servo and a friction plate of the clutch C-2 into mutual contact without a gap to make the clutch C-2 start torque transmission (power transmission).

Note that when shifting is performed through shift speeds from the above-described first forward speed to sixth forward speed, the role of each linear solenoid valve (not shown) is switched depending on each shifting operation; that is, one linear solenoid valve serves as a linear solenoid valve for regulating the pressure supplied to a hydraulic servo of a friction engagement element on the engaging side (engaging-side pressure control valve) in one shifting operation, and as a linear solenoid valve for regulating the pressure supplied to a hydraulic servo of a friction engagement element on the releasing side (releasing-side pressure control valve) in another shifting operation.

Next, shift control by the shift control apparatus 1 according to the present exemplary embodiment of the present invention will be described by way of an example in which the shift control is applied to a downshift, for example, to a 6th-to-3rd shift (6th-4th-3rd shift) by engagement switching of four elements, and with reference to FIGS. 5 to 9.

Figure 5:
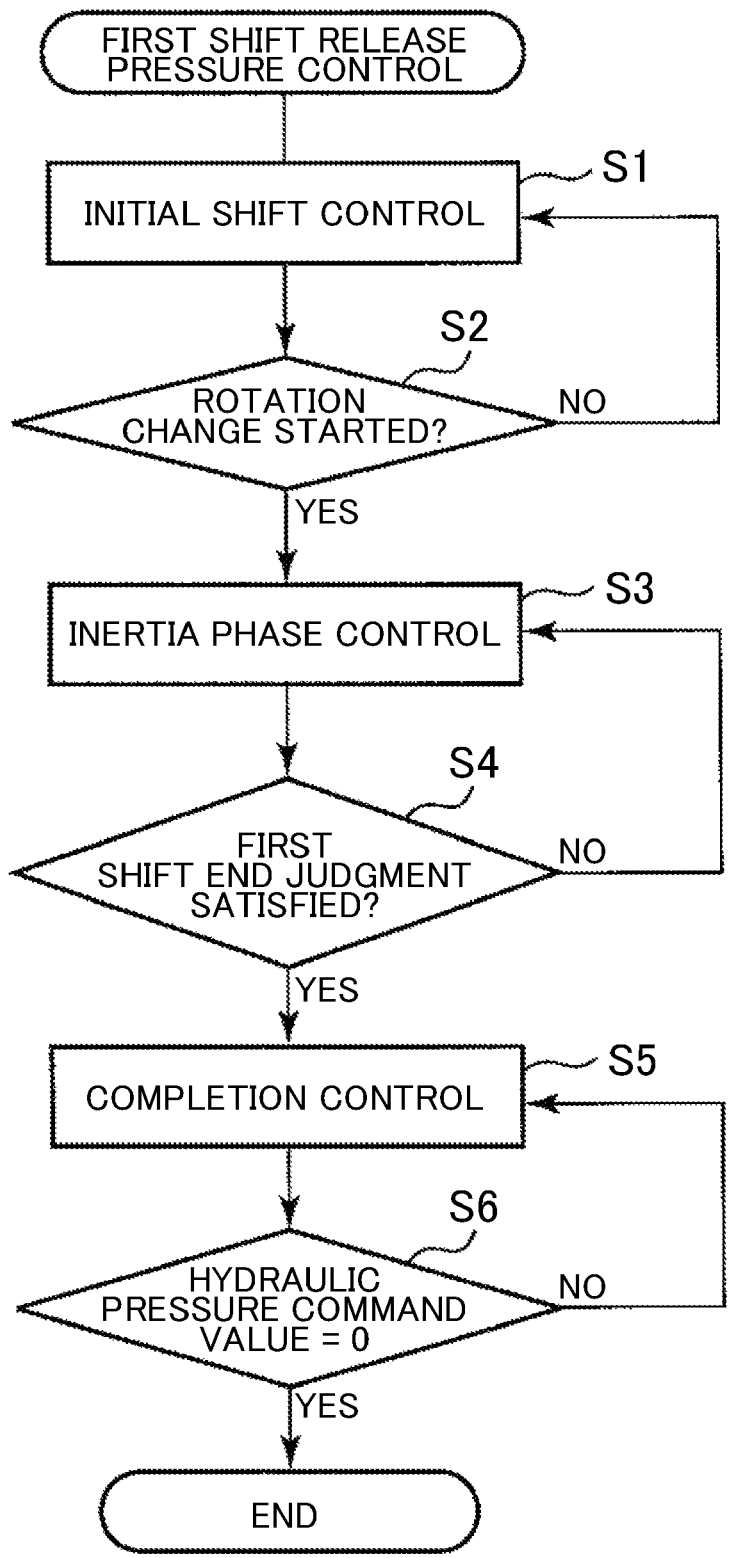
FIG. 5 is a flow chart for hydraulic control of a brake B-1 serving as a first shift release element consistent with an exemplary embodiment of the present invention.
Figure 6:
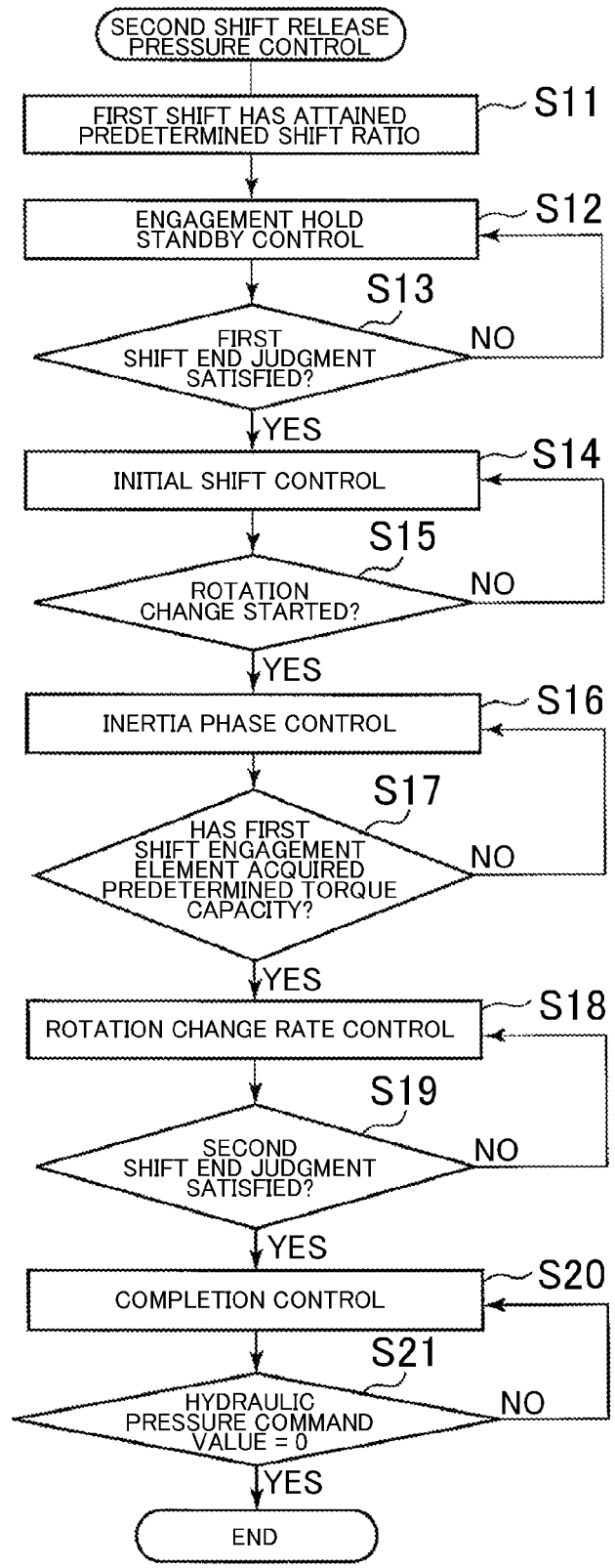
FIG. 6 is a flow chart for hydraulic control of a clutch C-2 serving as a second shift release element consistent with an exemplary embodiment of the present invention.
Figure 7:
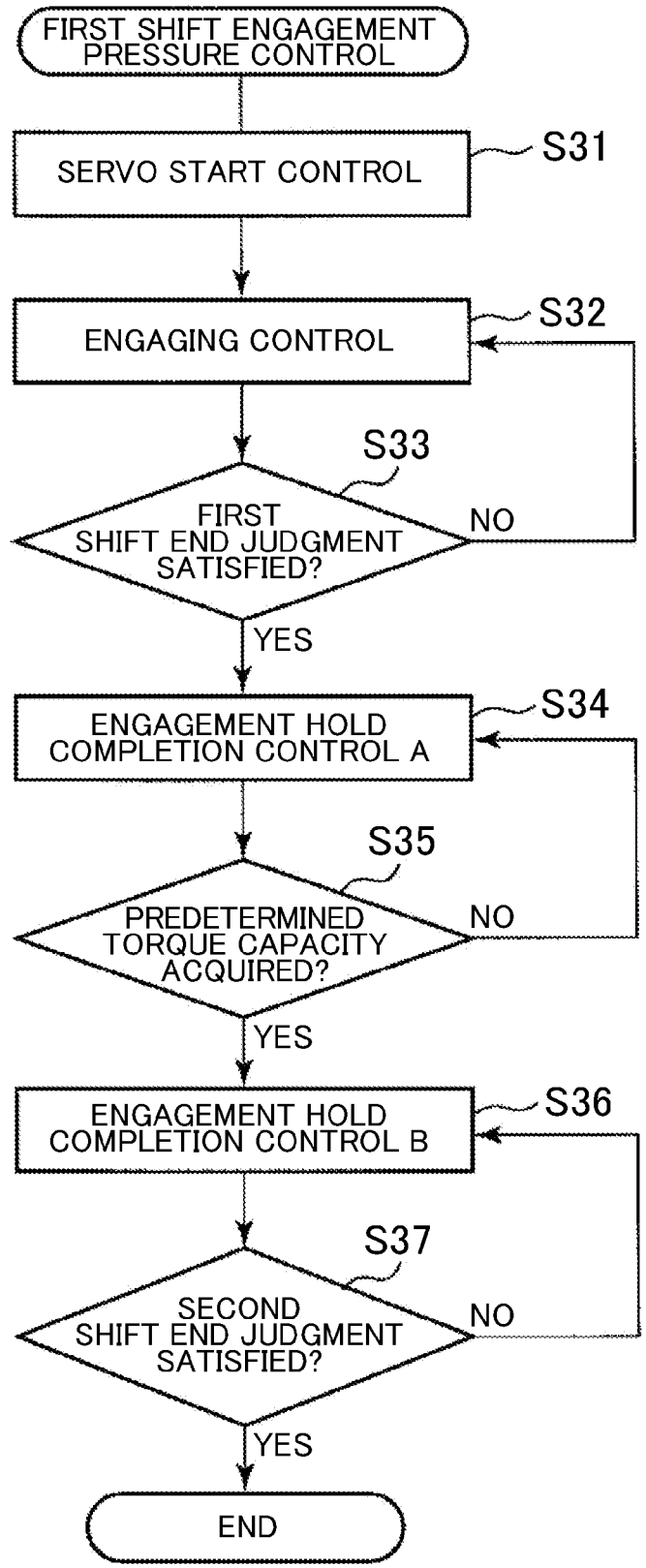
FIG. 7 is a flow chart for hydraulic control of a clutch C-1 serving as a first shift engagement element consistent with an exemplary embodiment of the present invention.
Figure 8:
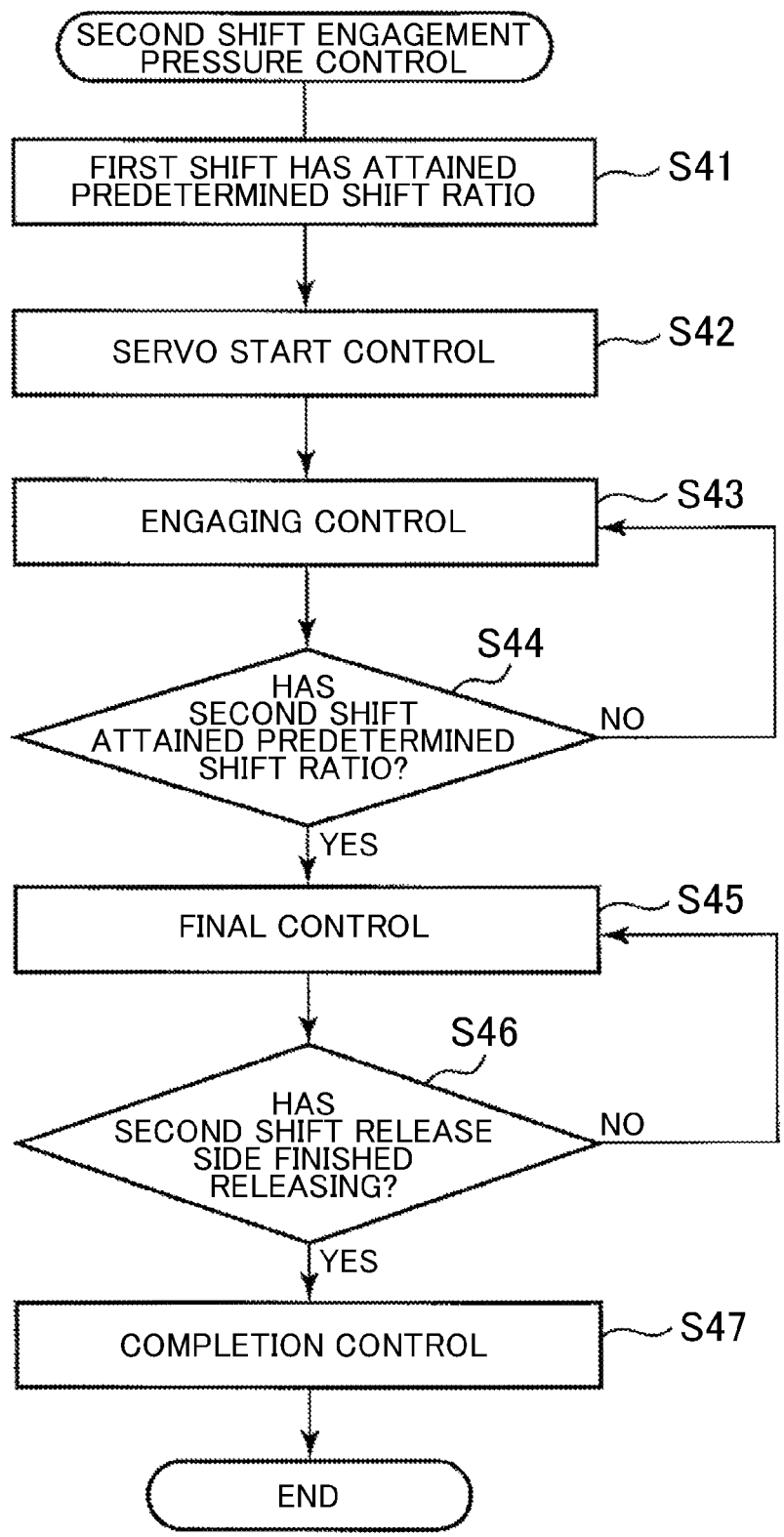
FIG. 8 is a flow chart for hydraulic control of a clutch C-3 serving as a second shift engagement element consistent with an exemplary embodiment of the present invention.

Note that FIG. 5 is a flow chart for hydraulic control of the brake B-1 serving as a first shift release element; FIG. 6 is a flow chart for hydraulic control of the clutch C-2 serving as a second shift release element; FIG. 7 is a flow chart for hydraulic control of the clutch C-1 serving as a first shift engagement element; and FIG. 8 is a flow chart for hydraulic control of the clutch C-3 serving as a second shift engagement element. In addition, FIG. 9 is a time chart showing shift control according to the present exemplary embodiment of the present invention, and shows from the top, changes in the rotation speed of the input shaft 10 (input shaft rotation speed) of the automatic speed change mechanism 5, and changes in the respective hydraulic pressures (hydraulic pressure command values) of the clutches C-1, C-2, and C-3, and the brake B-1 serving as four elements of engagement switching. In FIG. 9, reference character A denotes the time at the end of the first shift, reference character B denotes the time at the start of the second shift, and reference character C denotes the time at the end of the second shift; in addition, the solid line for the input shaft rotation speed represents that of an exemplary embodiment of the present invention, whereas the dashed line for the input shaft rotation speed represents that of the basic technology shown in FIG. 13. Moreover, in FIG. 9 and later-described FIG. 13, reference character PB1 denotes the pressure of the brake B-1, and reference characters PC1, PC2, and PC3 denote the pressures of the clutches C-1, C-2, and C-3, respectively.

In the present exemplary embodiment, the pairs of friction engagement elements used for downshift by engagement switching of the four elements are a pair of the brake B-1 that is in the engaged state at the sixth forward speed (high shift speed) on the higher speed side of the fourth forward speed (intermediate shift speed) and released during shifting from the sixth forward speed to the fourth forward speed, and the clutch C-2 that is in the engaged state at both the sixth and fourth forward speeds and released during shifting to the third forward speed (low shift speed) on the lower speed side of the fourth forward speed; and a pair of the clutch C-1 that is in the released state at the sixth forward speed and engaged at the fourth forward speed, maintaining the engagement until reaching the third forward speed, and the clutch C-3 that is in the released state at both the sixth and fourth forward speeds, and engaged at the third forward speed.

In other words, when downshifting (power downshifting) is performed during driving, for example, at the sixth forward speed, a shift command is issued from the shift controller 30, and then the releasing-side shift control section 31 starts to hydraulically control the brake B-1 serving as a first shift release element as shown in FIG. 5. At this point of time, the clutch C-2 and the brake B-1 are in the completely engaged state, establishing the sixth gear, as shown in FIG. 3.

According to the exemplary embodiment shown in FIG. 5, first, at operation S1 (time $t_1$ to $t_2$ in FIG. 9), the releasing-side shift control section 31 starts initial shift control and reduces the pressure of the hydraulic servo (not shown) of the brake B-1 at a constant rate. At operation S2, the releasing-side shift control section 31 judges, by the rotation change based on the gear ratio detected in the shift progress judging section 33, whether the rotation has started changing in the automatic speed change mechanism 5; if the rotation has started changing (S2; YES), then the procedure proceeds to operation S3, or if the rotation has not started changing (S2; NO), then the operation S1 is repeated.

Then, at the operation S3 (time $t_3$ to $t_4$ in FIG. 9), inertia phase control is started to reduce the pressure of the hydraulic servo of the brake B-1 at a constant rate, and then the procedure proceeds to operation S4. At the operation S4 (time $t_4$ to $t_6$ in FIG. 9), a judgment is made as to whether a first shift end judgment is satisfied; if it is not judged to be satisfied (S4; NO), then the operation S3 is repeated, or if it is judged to be satisfied (S4; YES), then the procedure proceeds to operation S5.

At the operation S5 (time $t_6$ to $t_7$ in FIG. 9), completion control is started to reduce the pressure of the hydraulic servo of the brake B-1 at a constant rate, and then the procedure proceeds to operation S6. At the operation S6, a judgment is made as to whether the value of the hydraulic pressure command to the hydraulic servo of the brake B-1 has become 0; while it has not become 0, the operation S5 is repeated (S6; NO), and when it is judged to have become 0 (S6; YES), then the control is terminated.

On the other hand, in the hydraulic control of the clutch C-2 as a second shift release element as shown in FIG. 6, after the first shift has attained a predetermined shift ratio at operation S11, the releasing-side shift control section 31, operating based on the shift command, proceeds to operation S12 (time $t_1$ to $t_5$ in FIG. 9). At the operation S12, engagement hold standby control is started to output the control pressure ($P_1$) equivalent to the torque capacity or less (near the stroke-end pressure), and then the procedure proceeds to operation S13.

At the operation S13, a judgment is made as to whether the first shift end judgment is satisfied; if the end judgment is not judged to be satisfied (S13; NO), then the operation S12 is repeated, or if the end judgment is judged to be satisfied (S13; YES), the procedure proceeds to operation S14.

At the operation S14, initial shift control is started (time $t_5$ to $t_6$ in FIG. 9), the pressure to the hydraulic servo of the clutch C-2 is reduced at a constant rate, and then the procedure proceeds to operation S15. At the operation S15, a judgment is made as to whether the rotation has started changing; if the rotation is not judged to have started changing (S15; NO), then the operation S14 is repeated, or if the rotation is judged to have started changing (S15; YES), then the procedure proceeds to operation S16.

At the operation S16, inertia phase control is started to reduce the pressure to the hydraulic servo of the clutch C-2 at a constant rate, and then the procedure proceeds to operation S17. At the operation S17 (time $t_6$ in FIG. 9), a judgment is made as to whether the clutch C-1 serving as a first shift engagement element has acquired the predetermined torque capacity ($P_2$ in FIG. 9); if the predetermined torque capacity is not judged to be acquired (S17; NO), then the operation S 16 is repeated, or if the predetermined torque capacity is judged to be acquired (S17; YES), then the procedure proceeds to operation S18.

At the operation S18, rotation change rate control, which is an FB control to bring the rotation change close to a target rotational acceleration, is started, and then the procedure proceeds to operation S19. At the operation S19, a judgment is made as to whether a second shift end judgment is satisfied; if it is not judged to be satisfied (S19; NO), then the operation S18 is repeated, or if it is judged to be satisfied (S19; YES), then the procedure proceeds to operation S20.

At the operation S20, completion control is started to reduce the pressure to the hydraulic servo of the clutch C-2 at a constant rate, and the procedure proceeds to operation S21, where a judgment is made as to whether the value of the hydraulic pressure command to the hydraulic servo of the clutch C-2 has become 0; while it has not become 0, the operation S20 is repeated (S21; NO), and when it is judged to have become 0 (S21; YES), then the control is terminated (time $t_6$ to $t_7$ in FIG. 9).

In addition, in the hydraulic control of the clutch C-1 serving as a first shift engagement element as shown in FIG. 7, the engaging-side shift control section 32 starts servo start control based on the shift command at operation S31, and starts engaging control to increase the hydraulic pressure at a very slow constant rate in operation S32; then the procedure proceeds to operation S33 (time $t_3$ to $t_6$ in FIG. 9).

At the operation S33, a judgment is made as to whether the first shift end judgment is satisfied (time $t_6$ to $t_7$ in FIG. 9); if it is not judged to be satisfied (S33; NO), then the operation S32 is repeated, or if it is judged to be satisfied (S33; YES), then the procedure proceeds to operation S34.

At the operation S34, engagement hold completion control A is started to increase the pressure to the hydraulic servo of the clutch C-1 at a slow constant rate (time $t_7$ in FIG. 9), and at operation S35, a judgment is made as to whether the predetermined torque capacity ($P_2$ in FIG. 9) is acquired. If, as a result, it is judged that the predetermined torque capacity is not acquired (S35; NO), then the operation S34 is repeated, or if it is judged that the predetermined torque capacity is acquired (S35; YES), then the procedure proceeds to operation S36.

At the operation S36, engagement hold completion control B is started to engage the clutch C-1 by quickly increasing the pressure to the hydraulic servo of the clutch C-1 (time $t_9$ in FIG. 9). Subsequently, at operation S37, a judgment is made as to whether the shift end judgment of the second shift is satisfied; if it is judged that the shift end judgment of the second shift is not satisfied (S37; NO), then the operation S36 is repeated, or if it is judged that the shift end judgment of the second shift is satisfied (S37; YES), the control is terminated (time $t_9$ to $t_{12}$ in FIG. 9).

In addition, in the hydraulic control of the clutch C-3 serving as a second shift engagement element as shown in FIG. 8, when the first shift has attained the predetermined shift ratio at operation S41, the engaging-side shift control section 32 operating based on the shift command proceeds to operation S42 to start servo start control (time $t_6$ to $t_8$ in FIG. 9), and at operation S43, starts engaging control to increase the pressure to the hydraulic servo of the clutch C-3 at a very slow constant rate (time $t_8$ to $t_{10}$ in FIG. 9).

Then, at operation S44, a judgment is made as to whether the second shift has attained a predetermined shift ratio; if it is judged that the predetermined shift ratio has not been attained (S44; NO), then the operation S43 is repeated, or if it is judged that the predetermined shift ratio has been attained (S44; YES), then the procedure proceeds to operation S45.

At the operation S45, final control is started where a pressure to engage (joint) a predetermined ratio of an input torque is output to the hydraulic servo of the clutch C-3 (time $t_{10}$ to $t_{12}$ in FIG. 9), and at operation S46, a judgment is made as to whether the clutch C-2 serving as a second shift release element has finished the release; if the release is not finished (S46; NO), then the operation S45 is repeated, or if the release is finished (S46; YES), then the procedure proceeds to operation S47, and after starting completion control, the control is terminated.

In the present exemplary embodiment described above, during the downshift to the speed spaced apart by two or more steps through the fourth forward speed (intermediate shift speed) by disconnecting and connecting the respective pairs of the friction engagement elements, the shift controller 30 performs the control so as to form the third forward speed (low shift speed) by first releasing the brake B-1 and the clutch C-2, then engaging the clutch C-1, and finally engaging the clutch C-3 while controlling the torque capacity of the clutch C-2 by feedback control. Therefore, as a result of releasing the brake B-1 and the clutch C-2 before engaging the clutch C-1, it is possible to rev up the input rotation (turbine rotation) at maximum performance of the engine 2, to which the automatic transmission 3 is connected, to reduce the time for shifting, and also as a result of the feedback control of the torque capacity of the clutch C-2 after engaging the clutch C-1, the torque fluctuation at the fourth forward speed (intermediate shift speed) can be reduced to avoid occurrence of an uncomfortable shift shock.

Specifically, the shift controller 30 performs the control so as to form the third forward speed (low shift speed) by first virtually completely releasing the brake B-1 and also releasing the clutch C-2 to make its torque capacity stand by at the pressure near the engagement starting pressure ($P_1$ in FIG. 9) during the releasing of the brake B-1 and the clutch C-2, then by engaging the clutch C-1 so as to acquire the predetermined torque capacity ($P_2$ in FIG. 9), and finally by engaging the clutch C-3 at the predetermined rate without a halt, while controlling, by feedback control, the torque capacity of the clutch C-2 standing by at the pressure near the engagement starting pressure. Therefore, even while the clutch C-1 is engaging, it is possible to rev up the input rotation at maximum performance of the engine 2 by putting the clutch C-2 under the pressure near the engagement starting pressure; thus a disadvantage can be avoided such as the increase in the time for shifting due to the time required until the end of the second shift.

Figure 10:
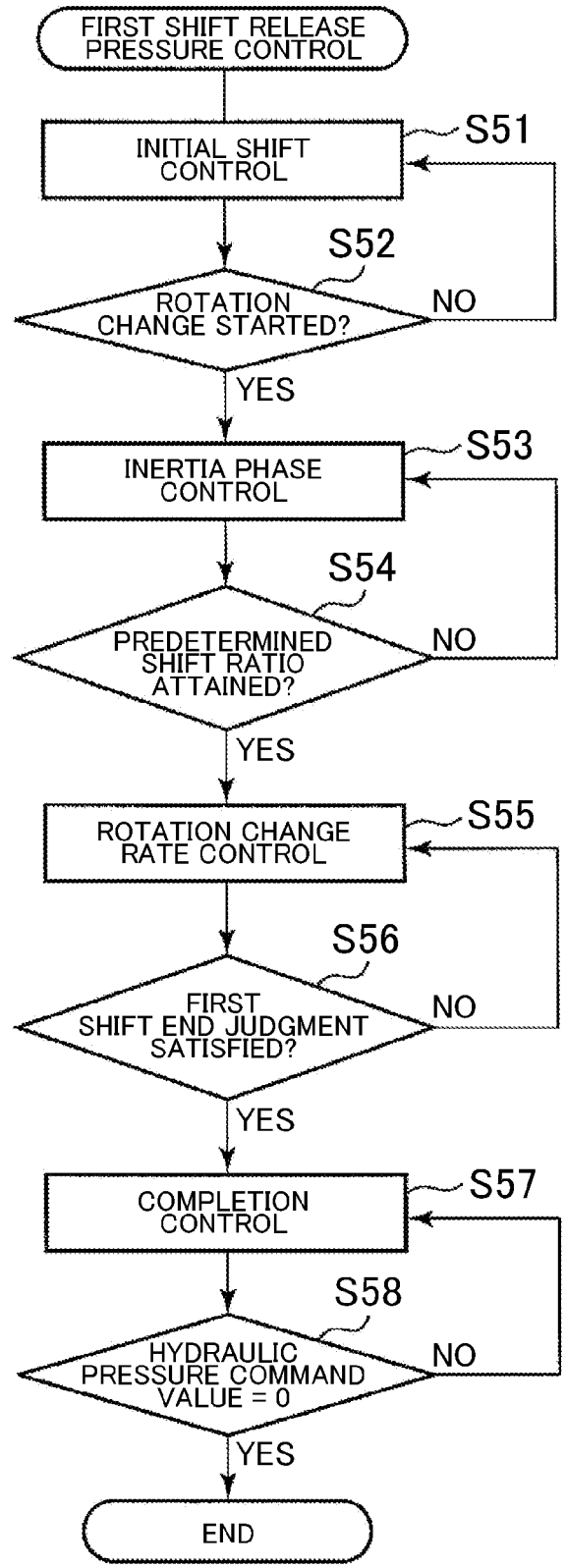
FIG. 10 is a flow chart for hydraulic control of a first shift release element according to a technology serving as a basis for exemplary embodiments of the present invention.

Note that the hydraulic control of the brake B-1 serving as a first shift release element, which has been described with reference to the flow chart shown in FIG. 5, is as shown by the flow chart in FIG. 10, according to the technology serving as a basis for exemplary embodiments of the present invention. According to the technology serving as a basis for exemplary embodiments of the present invention, although the processing of operations S51 to S53 shown in FIG. 10 is the same as that of the operations S1 to S3 shown in FIG. 5 according to the present exemplary embodiment, the processing from operation S54 and later differs from that of the present exemplary embodiment.

More specifically, according to the technology serving as a basis for exemplary embodiments of the present invention, the same processing as that of the operations S1 to S3 shown in FIG. 5 of the present exemplary embodiment is performed (time $t_{21}$ to $t_{24}$ in FIG. 13), and then at the operation S54, a judgment is made as to whether the predetermined shift ratio has been attained (time $t_{24}$ to $t_{26}$ in FIG. 13); if it is not judged to have been attained (S54; NO), then the inertia phase control of the operation S53 is repeated, or if it is judged to have been attained (S54; YES), then the procedure proceeds to operation S55. Note that in FIG. 13, reference numeral A denotes the time at the end of the first shift, reference numeral B the time at the start of the second shift, and reference numeral C the time at the end of the second shift.

At the operation S55, the rotation change rate control, which is an FB control to bring the rotation change close to a target rotational acceleration, is started, and then at operation S56, a judgment is made as to whether the first shift end judgment is satisfied; if it is not judged to be satisfied (S56; NO), then the rotation change rate control of the operation S55 is repeated, or if it is judged to be satisfied (S56; YES), then the completion control is started at operation S57, and then the procedure proceeds to operation S58 (time $t_{26}$ to $t_{28}$ in FIG. 13).

At the operation S58, a judgment is made as to whether the value of the hydraulic pressure command to the hydraulic servo of the brake B-1 has become 0; while it has not become 0, the operation S57 is repeated (S58; NO), and when it is judged to have become 0 (S58; YES), the control is terminated (time $t_{28}$ in FIG. 13).

Figure 11:
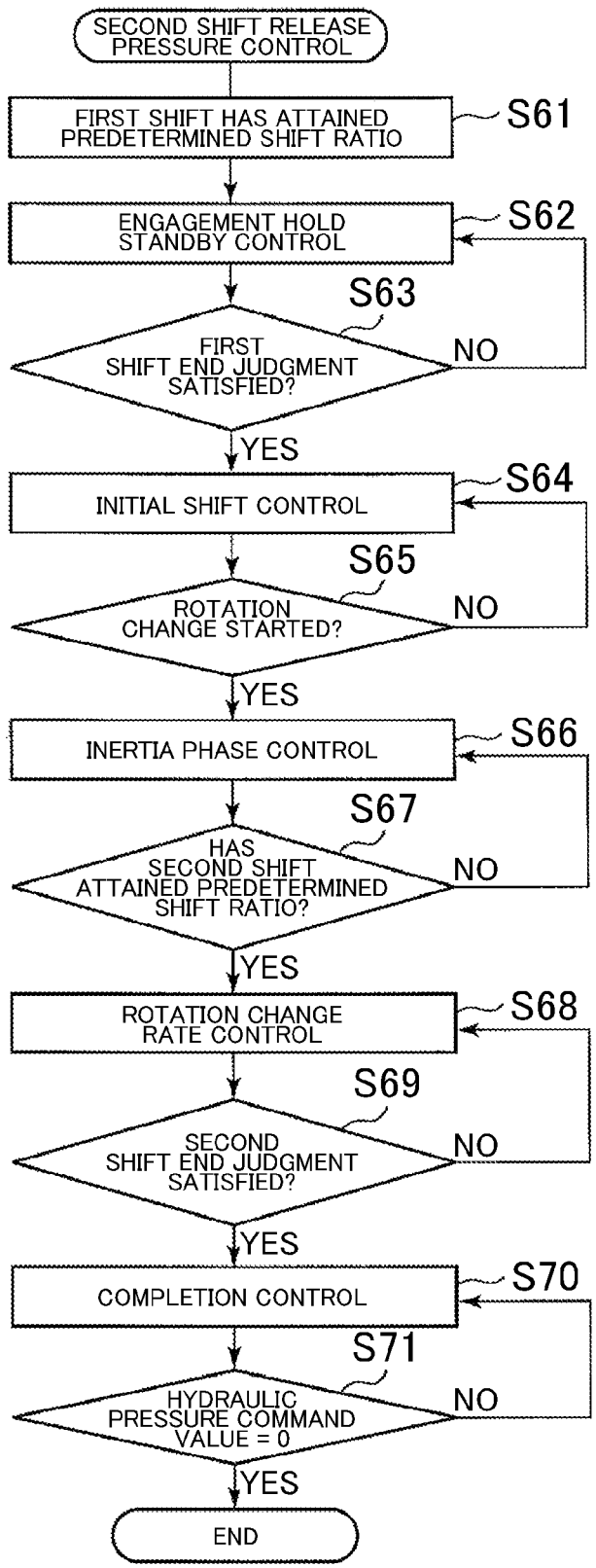
FIG. 11 is a flow chart for hydraulic control of a second shift release element according to the technology serving as a basis for exemplary embodiments of the present invention.

In addition, the hydraulic control of the clutch C-2 serving as a second shift release element, which has been described with reference to the flow chart shown in FIG. 6, is as shown by the flow chart in FIG. 11, according to the technology serving as a basis for exemplary embodiments of the present invention. According to the technology serving as a basis for exemplary embodiments of the present invention, the processing of operations S62 and S67 shown in FIG. 11 differs from that of the operations S 12 and S 17 shown in FIG. 6 of the present exemplary embodiment, whereas the other processing is the same as that of the present exemplary embodiment.

The control of the clutch C-2 serving as a second shift release element, which has been described with reference to the flow chart shown in FIG. 6, is as shown by the flow chart in FIG. 11, according to the technology serving as a basis for exemplary embodiments of the present invention. According to the technology serving as a basis for exemplary embodiments of the present invention, engagement hold standby control is started at the operation S62 to output a control pressure ensuring the torque capacity, whereas the operation S12 shown in FIG. 6 of the present exemplary embodiment is different in that the control outputs a control pressure equivalent to the torque capacity or less (near the stroke-end pressure). In addition, according to the technology serving as a basis for exemplary embodiments of the present invention, a judgment is made at the operation S67 as to whether the second shift has attained a predetermined shift ratio, whereas the operation S17 shown in FIG. 6 of the present exemplary embodiment is different in that a judgment is made as to whether the clutch C-1 serving as a first shift engagement element has acquired a predetermined torque capacity.

Figure 12:
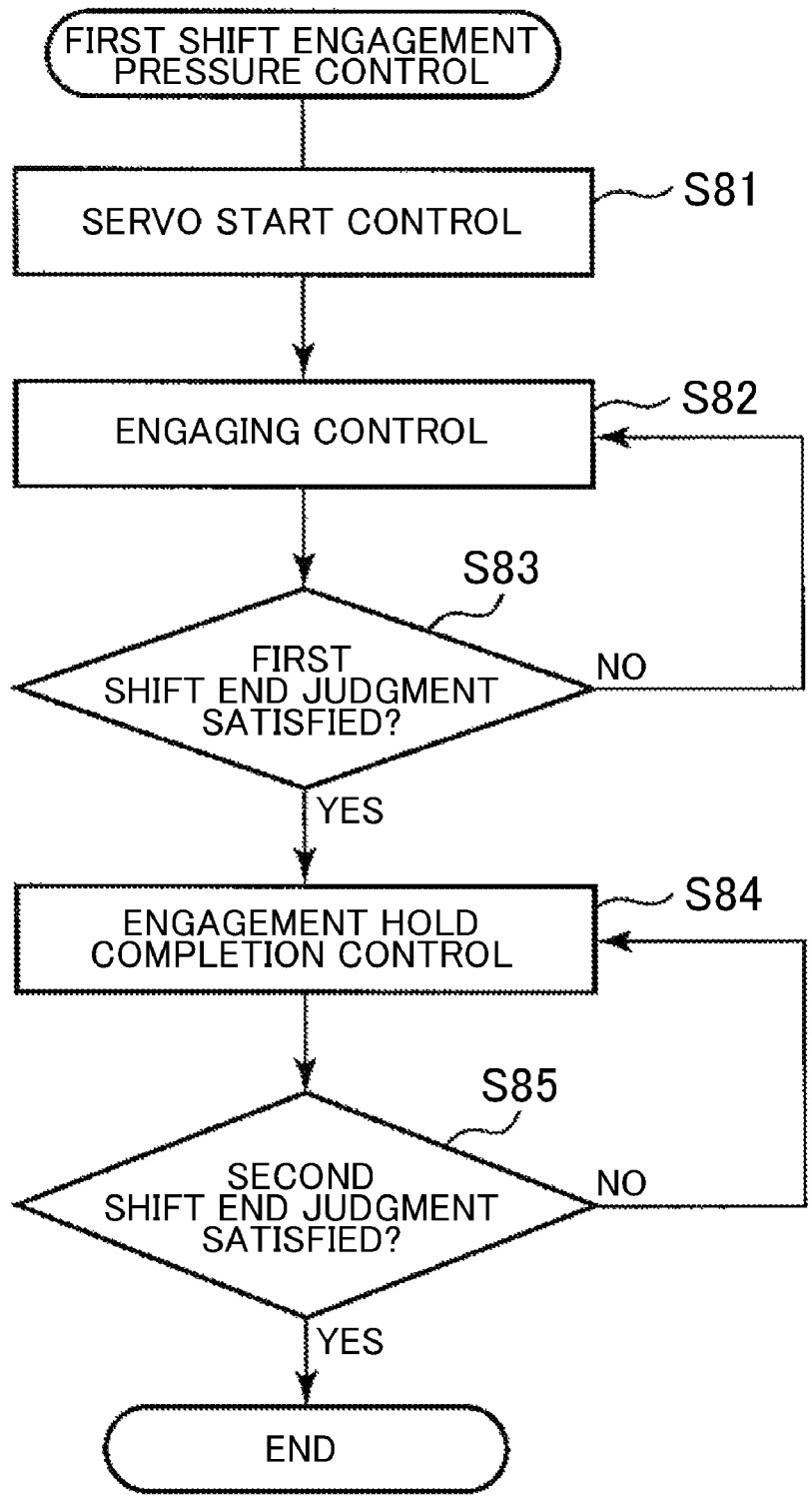
FIG. 12 is a flow chart for hydraulic control of a first shift engagement element according to the technology serving as a basis for exemplary embodiments of the present invention.
Figure 13:
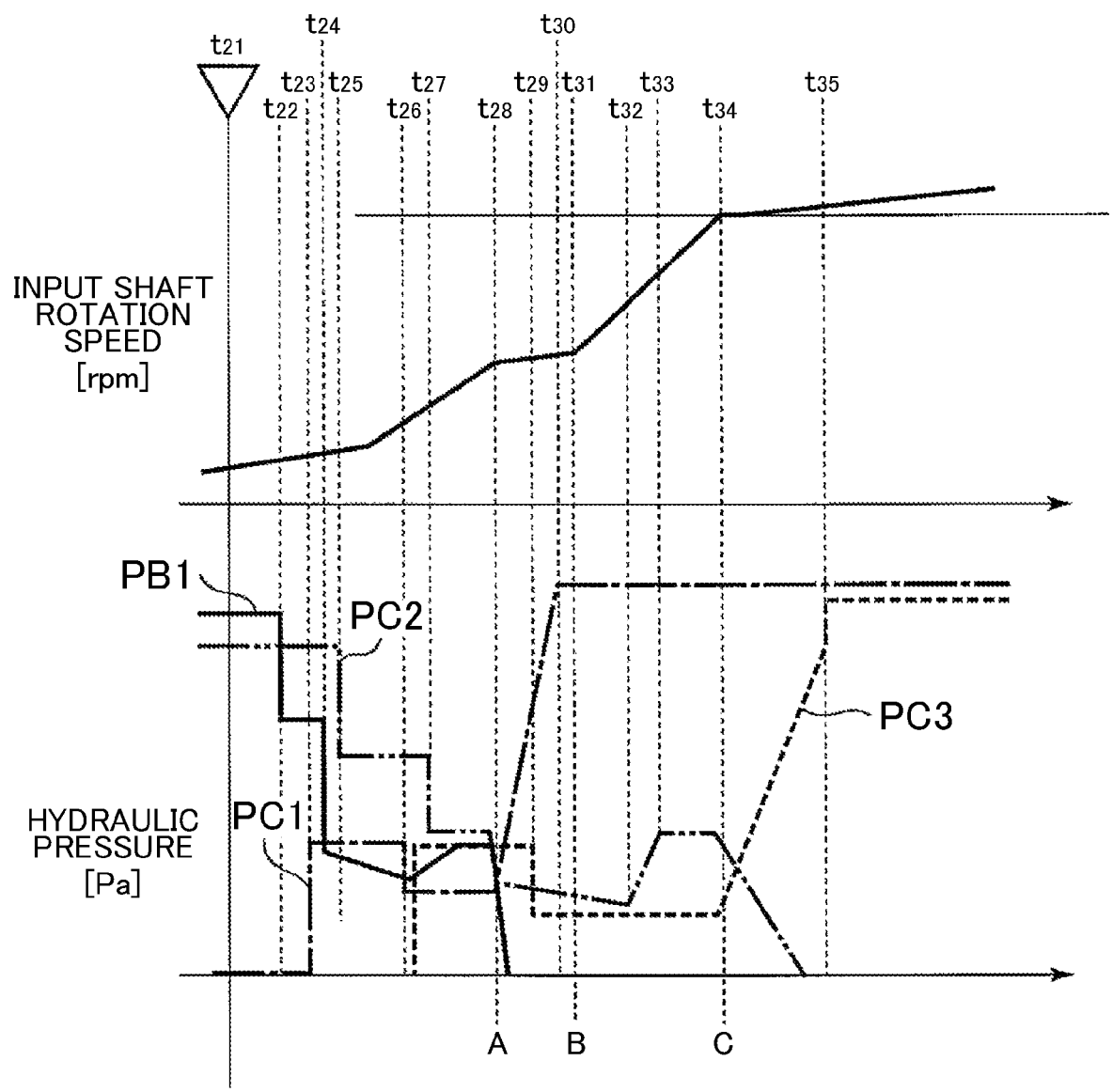
FIG. 13 is a time chart showing shift control with the technology serving as a basis for exemplary embodiments of the present invention.

Moreover, the hydraulic control of the clutch C-1 serving as a first shift engagement element, which has been described with reference to the flow chart shown in FIG. 7, is as shown by the flow chart in FIG. 12, according to the technology serving as a basis for exemplary embodiments of the present invention. According to the technology serving as a basis for exemplary embodiments of the present invention, the processing of operations S83 and S84 shown in FIG. 12 differs from that of the operations S33, S34, and S35 shown in FIG. 7 of the present exemplary embodiment, whereas the other processing is the same as that of the present exemplary embodiment.

More specifically, according to the technology serving as a basis for exemplary embodiments of the present invention, after starting the same engaging control as that of the present exemplary embodiment at operation S82, a judgment is made at the operation S83 as to whether the first shift end judgment is satisfied (time $t_{28}$ in FIG. 13); if it is not judged to be satisfied (S83; NO), then the operation S82 is repeated, or if it is judged to be satisfied (S83; YES), then the procedure proceeds to operation S84, where engagement hold completion control is started. At operation S85, a judgment is made as to whether the shift end judgment of the same second shift as that of the present exemplary embodiment is satisfied (time $t_{34}$ in FIG. 13); if it is not judged to be satisfied (S85; NO), then the operation S84 is repeated, or if it is judged to be satisfied (S85; YES), then the control is terminated.

Note that, with respect to the hydraulic control of the clutch C-3 serving as a second shift engagement element, the technology serving as a basis for exemplary embodiments of the present invention executes the same control as that of the present exemplary embodiment shown in FIG. 8.

Because the hydraulic control according to such a basic technology performs control, differently from that of the present exemplary embodiment, so that the clutch C-1 and the clutch C-3 are engaged at the end of the first shift in which the brake B-1 and the clutch C-2 are released, it is difficult to reduce an uncomfortable shift shock and also difficult to obtain a contribution to reduce the time for shifting, compared with the above-described present exemplary embodiment.

Note that, in the above-described present exemplary embodiment, an example has been given in which the present invention is applied to the 6th-to-3rd shift (6th-4th-3rd shift). However, the present invention is not limited to this application, and can also be applied to, for example, a 5th-to-2nd shift (5th-3rd-2nd shift).

In that case, the first shift release element, which has taken the form of the brake B-1 in the present exemplary embodiment, takes the form of the clutch C-2, the second shift release element, which has taken the form of the clutch C-2 in the present exemplary embodiment, takes the form of the clutch C-3, the first shift engagement element, which has taken the form of the clutch C-1 in the present exemplary embodiment, remains to take the same form of the clutch C-1, and the second shift engagement element, which has taken the form of the clutch C-3 in the present exemplary embodiment, takes the form of the brake B-1. By this means, it is possible to obtain the same effect as that of the present exemplary embodiment.

Note that in the above-described present exemplary embodiment, explanation has been given of an example suitable for use in an FF type vehicle, as the automatic transmission 3 that achieves six forward speeds and one reverse speed. However, the present invention is not limited to this application, and can also be applied to an automatic transmission suitable for use in a vehicle of FR (front engine, rear drive) type or any other type.

The shift control apparatus for an automatic transmission according to some aspects of the present invention can be used in an automatic transmission mounted on a passenger vehicle, truck, bus, agricultural machine, or the like, and is particularly suitable for use in an automatic transmission for which an improvement in shift shock is required when performing a jumping shift by engagement switching.

It is contemplated that numerous modifications may be made to the exemplary embodiments of the invention described above without departing from the spirit and scope of the embodiments of the present invention as defined in the following claims.

What is claimed is:

1. A shift control apparatus for an automatic transmission, the shift control apparatus comprising:
a controller configured to control the automatic transmission;
wherein the automatic transmission comprises a plurality of friction engagement elements whose engagement states achieve a plurality of corresponding power transmission paths in a speed change gear mechanism; and
wherein the automatic transmission is configured to shift speeds by switching engagement among the plurality of friction engagement elements;
wherein the controller is configured to control a downshift from a higher shift speed to a lower shift speed, through an intermediate shift speed, by disconnecting and connecting respective pairs of the plurality of friction engagement elements at a single switching of the engagement;
wherein the lower shift speed is spaced apart from the higher shift speed by two or more steps;
wherein the pairs of the plurality of friction engagement elements comprise:
a first pair comprising:
a first shift release element that is in an engaged state at the higher shift speed and that is released during shifting from the higher shift speed to the intermediate shift speed; and
a second shift release element that is in an engaged state at both the higher shift speed and the intermediate shift speed and that is released during shifting from the intermediate shift speed to the lower shift speed; and
a second pair comprising:
a first shift engagement element that is in a released state at the higher shift speed and that is engaged at the intermediate shift speed and maintains engagement until reaching the lower shift speed; and
a second shift engagement element that is in a released state at both the higher shift speed and the intermediate shift speed, and that is engaged at the lower shift speed; and
wherein the controller is configured to control the downshift to the lower shift speed by, first, completely releasing the first shift release element and releasing the second shift release element so as to make the torque capacity of the second shift release element stand by at a pressure near an engagement starting pressure, then engaging the first shift engagement element so as to acquire a predetermined torque capacity, and then engaging the second shift engagement element at a predetermined rate without a halt, while controlling the torque capacity of the second shift release element by feedback control so as to control a rotation change rate of a rotation speed of the automatic transmission to become a target rotational acceleration.

* * * * *